Jan. 13, 1970   K. D. BIXLER ET AL   3,489,270
PLASTIC CONTAINER

Filed Sept. 15, 1967   3 Sheets-Sheet 1

INVENTORS
KENNETH D. BIXLER
RONALD A. SCHELMETIC

BY  Karl W. Flocks

ATTORNEY

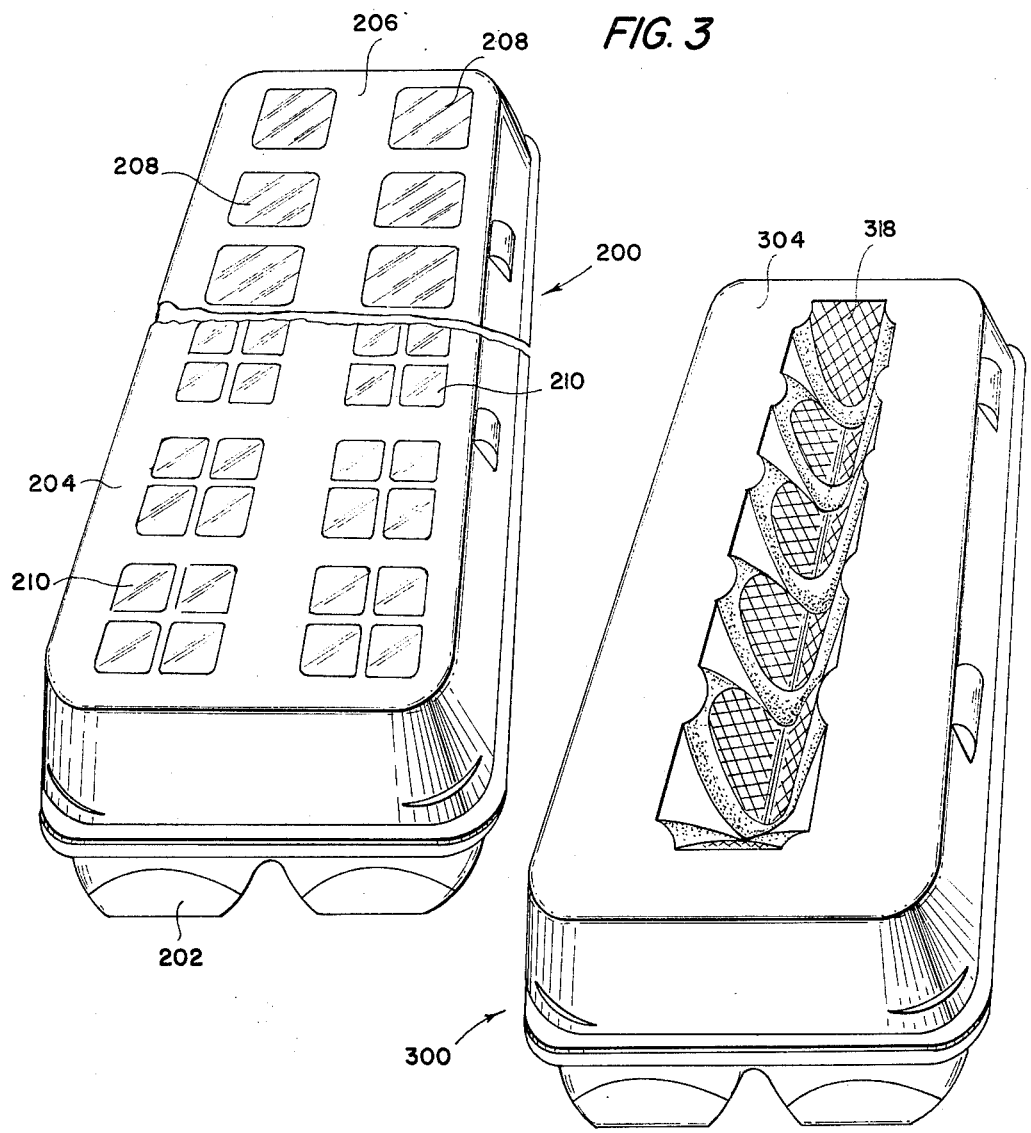

Jan. 13, 1970 K. D. BIXLER ET AL 3,489,270
PLASTIC CONTAINER
Filed Sept. 15, 1967 3 Sheets-Sheet 3

INVENTORS
KENNETH D. BIXLER
RONALD A. SCHELMETIC

BY Karl W. Flocks
ATTORNEY

United States Patent Office 3,489,270
Patented Jan. 13, 1970

3,489,270
PLASTIC CONTAINER
Kenneth D. Bixler, Huntington, N.Y., and Ronald A. Schelmetic, Bridgeport, Conn., assignors to Diamond International Corporation, New York, N.Y., a corporation of Delaware
Filed Sept. 15, 1967, Ser. No. 668,055
Int. Cl. B65d *19/04*
U.S. Cl. 206—45.31        2 Claims

ABSTRACT OF THE DISCLOSURE

The present disclosure relates to food containers such as meat trays and egg cartons formed of a foam plastic, e.g. polystyrene foam, which containers have transparent plastic windows through which the food packaged therein may be viewed. The solid plastic windows are integral with the foam, the trays being formed from integral sheets: The windows are provided by applying localized heat and pressure to specified portions of the foamed container to collapse the cells or bubbles and thereby render the so treated portions transparent.

---

The present invention relates to foam plastic containers having transparent plastic windows and, more particularly, to food containers, such as food trays and egg boxes, formed of foam plastic which have portions in which the foam has been collapsed and rendered transparent.

See-through packages have continuously gained favor in the eyes of the purchasing public over the past several years. In trays, for the packaging of meat and poultry, for example, see-through packages have been utilized by the provision of a solid transparent plastic tray utilizing the conventional clear plastic over-wrap so that the packaged food, such as meat, can be seen not only from the top through the over-wrap, but also from the bottom through the transparent plastic tray. Such packages have not been entirely satisfactory, however, not only because of their lack of strength and poor insulating properties, but because such trays require a substantial thickness of plastic which renders the tray prohibitively expensive.

Composite see-through packages have been known for many years and usually comprise some type of paperboard container having an open, die-cut window to which is laminated, such as by gluing, a transparent plastic film, such as a cellophane or polyethylene film, to provide the see-through package. Other types of composite see-through packages, such as blister packs, bubble packs, skin packages and shrink packages have gained favor in recent years, but not only are these latter packages generally unsuitable for the packaging of comestibles, but they also require laminating, gluing or associating of some type between the transparent portion and a self-supporting paperboard portion. Such laminating or other associating of separate components renders the manufacture of the container expensive by requiring not only the association of the two components to form the package, either prior to or during packaging, but by also requiring separate handling initially of two separate components.

With respect to see-through one piece packages, insofar as is known, the only such packages contemplated until the present time have been those which have either an open window or those which are formed of entirely transparent materials. The former packages can be used, clearly, only with materials which will not fall through the open window. The latter packages are expensive.

It is, therefore, an object of the present invention to overcome the deficiencies of the prior art, such as indicated above.

It is another object of the present invention to provide an integral, one-piece container having both opaque and transparent portions.

It is another object of the present invention to provide a simple package through which the contents may be viewed, yet which package is both inexpensive and protective of the contents.

It is another object of the present invention to form windows, that is to say transparent pane-like discrete areas, in the walls of articles made of foam plastic.

It is a further object of the present invention to provide an article such as a food tray or an egg box with windows through which the merchandise, such as meat or eggs, may be viewed, which article has features useful in the packaging field, such as resiliency, cushioning structure, rigidity where required, transparency where viewability is desired, opacity where light obstruction is desired, heat insulation where protection from high temperatures is essential, and heat conductivity where heat removal is required such as when a freshly purchased package of meat is first inserted into the home freezer.

It is another object of the present invention to provide an effective yet inexpensive food container of foam plastic which has integral, solid plastic windows therein.

It is another object of the present invention to provide a packaging container having see-through portions which may be formed in a single manufacturing process.

Other objects in the nature and advantages of the instant invention will become apparent from a consideration of the following description when taken in conjunction with the accompanying drawings forming a part thereof, wherein:

FIG. 3 is a perspective view, partly broken away, showing two additional embodiments of the present invention;

FIG. 4 is a perspective view of the same general type of container as illustrated in FIG. 3, but showing an additional embodiment;

As a general feature, the containers of the present invention are of one-piece construction and are formed primarily of a foamed plastic material, preferably foamed polystyrene or a foamed polyolefin, such as polyethylene or polypropylene. Those portions of the container which constitute the foamed plastic are, of course, opaque and of general heat-insulating character. The containers do, however, have further portions which constitute solid (i.e. transparent noncellular) "windows" which are entirely integral with the foamed portions, being formed of the same material in a "one-piece" structure. Such integral, one-piece containers are possible due to a special treatment of selected areas of the initially formed cellular container, which treatment renders these particular areas transparent; in other words, the container is first formed of unitary cellular foam plastic material and is then subsequently treated to render certain portions thereof, which remain integral with the remainder of the container, transparent. The window portions of the one-piece container are much thinner than are the foam portions. The term "one-piece" as used herein, is meant to indicate a single piece of material, although it is understood that a complete package may have an additional piece of material, such as a film overwrap, associated with the "one-piece" material.

Figure 1:
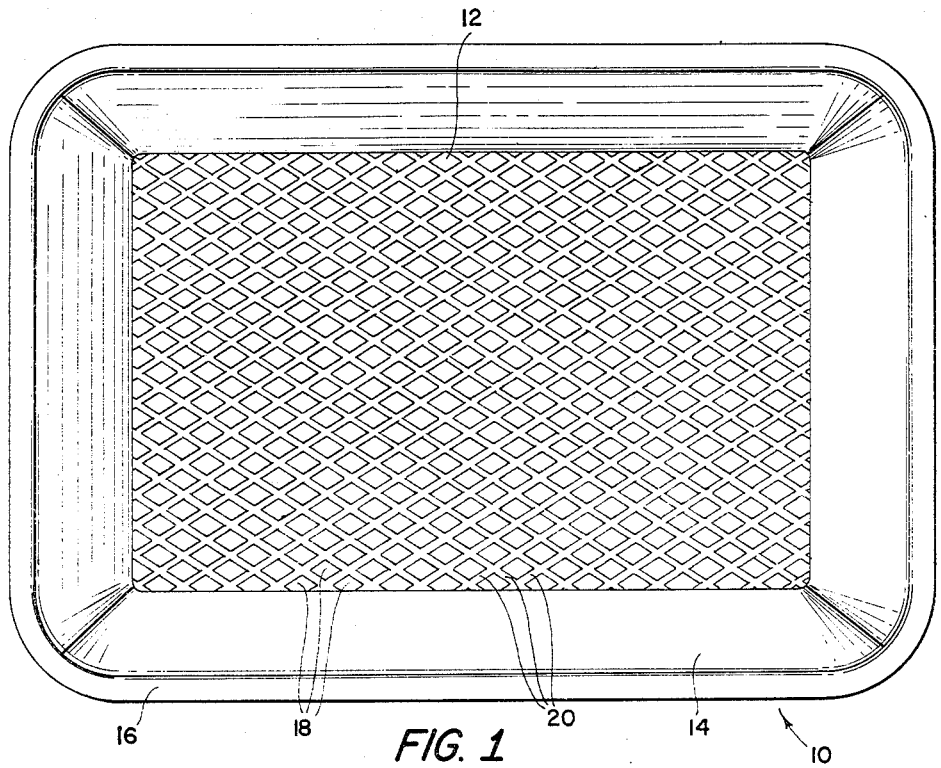
FIG. 1 is a plan view of one embodiment of the present invention.
Figure 2:
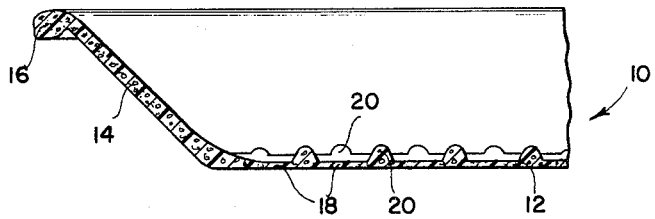
FIG. 2 is a partially broken away sectional view of the embodiment of FIG. 1.

Noting FIGS. 1 and 2, one embodiment of the invention may take the form of a meat packaging tray 10, suitble for the packaging of meat, fish and poultry both in the frozen and non-frozen state. Such a tray 10, after the comestible has been placed therein, may be overwrapped with a clear plastic film such as cellophane, polyethylene or polypropylene in a manner commonly applied to other food packaging trays. The tray 10 comprises a bottom wall 12 which is generally planular, an outwardly and upwardly extending side wall 14 which projects from the periphery of the bottom wall 12 and, preferably, an outwardly extending lip or flange 16 which projects outwardly from the upper end of the wall 14 and forms an angular bead about the tray 10. While the tray 10 is shown as being generally rectangular in form, it is understood that it may take a variety of shapes, such as circular, ellipsoidal, octagonal, etc.

While the tray 10 preferably is provided with the flange or lip 16, such a peripheral lip is not essential. However, when the article is made of foam polystyrene, which has low strength, it is desirable to provide the lip 16 and, in fact, provide such lip with a thickness greater than the normal thickness of the side wall 14 and the bottom 12, the lip 16 thereby functioning as a reenforcing and strengthening portion of the tray 10.

Figure 5:
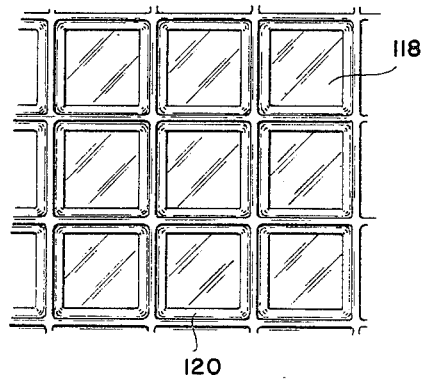
FIGS. 5 and 6 are partially broken away enlarged plan views of additional embodiments in accordance with the present invention.
Figure 6:
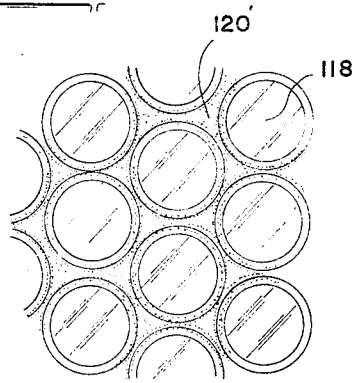

In accordance with the present invention, the bottom wall 12 of the tray 10 is provided with at least one, but preferably a plurality of transparent window portions 18. In the embodiment of FIG. 1, these window portions 18 are of diamond shape and each is relatively small; it should be understood, however, that the windows may take various shapes such as rectangular or circular as shown in FIGS. 5 and 6, respectively, and that the windows may be of larger size as shown in FIG. 3. While the window portions 18 are transparent and non-cellular, it is understood that the remainder of the tray 10, including the portions 20 between the windows 18, are of cellular foam material.

Noting FIG. 2 (also FIGS. 7 and 8), it is seen that the thickness of the window portions 18 are substantially less than the thickness of the remaining body portion of the container. Thus, the window portions 18 may have a thickness on the order of about three mils while the remaining body portion, as exemplified by the side wall 14, may have a thickness of ⅛ of an inch; it is, therefore, seen that the windows are on the order of 50 to 100 times thinner than the remaining body portion of the container.

The windows 18 in a meat packaging tray of the character of the tray 10 are preferably each of relatively small area, e.g. about 0.03 square inch. The transparent portions or windows 18 thereby serve a dual function: (1) they not only serve as windows through which the packaged material can be viewed from the bottom of the tray upwardly, but (2) they also serve as liquid retaining recesses in a manner similar to that shown in the Reifers et al. Patent No. 2,974,843. Another advantage in utilizing window portions 18 of relatively small area lies in the inherent provision of greater strength in the tray 10; thus, the separating portions 20 serve to reenforce the generally thin window portions 18 which are substantially weaker in strength than the foamed portion of the tray.

Noting FIGS. 3 and 4, it may be seen that the invention may be applied to other types of containers. Thus, FIGS. 3 and 4 show foam plastic egg boxes 200 and 300, respectively, each having an article receiving tray portion 202 and 302 and an integral hinged cover section 204 and 304, respectively. The article receiving tray portions each comprise a plurality of egg receiving pockets.

In the egg box 200 of FIG. 3, the cover 204 is provided with a generally flat top wall 206 which contains a plurality on non-cellular, transparent window sections, two types 208 and 210 being illustrated. The transparent windows 208 are located generally above each egg receiving pocket in the bottom 202 of the egg box 200 so that each egg may be viewed with the cover 204 enclosed in position. It is understood that the windows 208 may vary in size. Thus, in place of each window 208 there may be a plurality of small windows of the character of windows 18 of FIGS. 1 and 2, or the window size may be of intermediate size, such as the windows 210 in FIG. 3.

The egg box 300 of FIG. 4 is of the general configuration shown in the co-pending application of Bixler, Ser. #572,719, filed Aug. 16, 1966, which utilizes "open" windows. Thus, the foam plastic egg box 300 as shown in FIG. 4 may be provided with solid-non-cellular windows 318 as illustrated in FIG. 4, it being understood that such windows may be of the size as shown in FIG. 3.

As indicated above, the size and shape of the windows may be varied depending on the strength or other characteristics desired. FIG. 5 shows rectangular (square) windows 118 separated by foam portions 120, FIG. 6 shows circular windows 118' separated by foam portions 120'. Various other shapes may also be provided.

Containers of the type herein described are preferably formed in a single, two-step operation. For example, a generally flat sheet of foam plastic is first vacuum thermoformed into the container shape, the entire container being of opaque cellular foam. In the second step, the container is squeezed between mating dies under heat and pressure so as to collapse the foam and solidify and coalesce the plastic into a non-cellular transparent pane at the areas where windows are desired. The reforming of the foam into a clear, transparent pane can be accomplished by the suitable selection of pressure, temperature and time of treatment. Thus, at 18,000 p.s.i. and 250° F. applied to the lower die, the transparent windows 18 in the tray 10 are produced in three minutes. Greater temperatures and/or pressures reduce the time required to transform the foam to a transparent pane.

Figure 7:
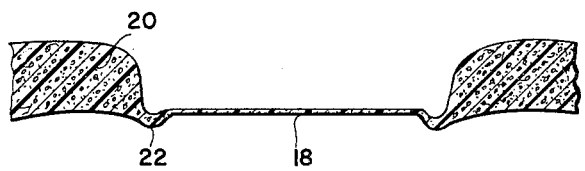
FIGS. 7 and 8 are detailed enlarged sectional views of different embodiments in accordance with the present invention.

Noting FIG. 7, it is seen that a window 18 may be surrounded by a peripheral zone 22 of flexible plastic which has a thickness greater than the pane 18, but less than the surrounding foam plastic portion 20. The peripheral zone of flexible plastic 22 is preferably given a U-shape to thereby serve as a shock absorber for the window 18. Such a formation 22 may be provided by proper die dimensions. By control of temperature, the flexible peripheral portion 22 may be rendered entirely solid or the cells may be only partially collapsed as illustrated.

To increase the flexibility of the window 18 and/or the flexible peripheral portion 22, the container may be subjected to an annealing procedure after its formation. If desired, and in place of the annealing operation, the formed container may be pressed in a cold die to effect cold flow of the window 18 thereby orienting the molecules and increasing the strength and flexibility of the window portion 18 and/or the peripheral portion 22.

Figure 8:
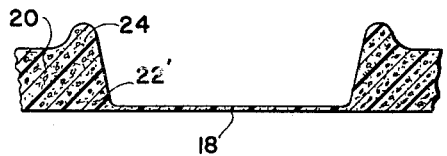

Noting FIG. 8, it is seen that the window 18 may be provided with a thickened frame 24 which peripherally surrounds the window 18 and lies adjacent the connecting portions 20. The frame 24 may be provided by suitable die design. The purpose of the frame 23 is to provide rigidifying or reenforcing of the window 18. By a suitable selection of die temperature, a flexible portion 22' can be provided at the juncture of the window 18 and the frame 24 by essentially completely collapsing the foam at such juncture.

It will be obvious to those skilled in the art that various changes may be made without departing from the scope of the invention and that invention is not to be considered limited to what is shown in the drawings and described in the specification.

What is claimed is:

1. A packaging container adapted primarily for packaging comestibles comprising;

a self-supporting shaped body portion at least part of which comprises an article receiving tray, said body portion being formed of a cellular foam plastic;

a self-supporting solid plastic, transparent window in said body portion and integral therewith, said solid plastic window being formed of the same foam plastic as said body portion, but which foam is collapsed and the plastic non-cellular, said window being on the order of 50-100 times thinner than said body portion;

a peripheral zone of flexible plastic surrounding said window and having a greater thickness than said window and a lesser thickness than the remainder of said body portion, said peripheral zone of flexible plastic comprising annealed and at least partially collapsed foam which is essentially non-cellular; whereby the article packaged in said container may be viewed through said window.

2. A container in accordance with claim 1 wherein said flexible peripheral zone about said window comprises essentially completely collapsed foam which is essentially non-cellular.

References Cited

UNITED STATES PATENTS

| | | | |
|---|---|---|---|
| 2,051,047 | 8/1936 | Hothersall | 266—45.31 |
| 3,017,987 | 1/1962 | Moslo | 206—45.31 |

JAMES B. MARBERT, Primary Examiner

U.S. Cl. X.R.

225—2.5